Patented Dec. 1, 1942

2,303,576

UNITED STATES PATENT OFFICE 2,303,576

LUMINESCENT MATERIAL FOR ELECTRIC DISCHARGE DEVICES

Herbert Nelson, Bloomfield, N. J., assignor to Radio Corporation of America, a corporation of Delaware No Drawing. Application October 30, 1941,
Serial No. 417,112

9 Claims. (Cl. 250—81)

My invention relates to luminescent materials or phosphors and particularly to phosphors comprising inorganic salts of an oxygen containing acid and to the combination of such phosphors in electric discharge devices in which a reducing action deleterious to the phosphor may occur.

Many luminescent materials, or phosphors, particularly those of the oxygen containing type such as silicates or germanates of zinc, zinc-beryllium, or zinc-zirconium and various tungstates when subjected to a cathode ray beam or the discharge in a luminescent lamp, are damaged so that the luminous output decreases rather rapidly with use. Such an effect is known as burning of the phosphor. While it has been proposed that this burning effect may be reduced by mixing metal monoxides with the phosphor, I have found such use disadvantageous because of the tendency of these manoxides to become reduced to the metal upon bombardment by the electron beam or luminescence producing discharge. The reduction of the monoxide to the metal appears to increase or accelerate the burning, especially over long periods of use. This accelerated burning is particularly noticeable when the phosphor is used in tubes provided with getters capable of combining with or absorbing the oxygen produced either by the decomposition of the oxide or the oxygen containing phosphor.

It is an object of my invention to provide an oxygen containing luminescent material or phosphor which is inherently stable under long continued use. It is another object to maintain a luminescent salt of an oxygen containing acid stable under long continued use as an element in an electric discharge device such as a cathode ray tube or luminescent lamp. It is a further object to provide phosphors having long life with appreciable deterioration when excited by corpuscular energy such as by electronic or ionic bombardment.

In accordance with my invention I provide a phosphor comprising a luminescent inorganic salt of an oxygen containing acid with an addition in the free state of a metallic oxide higher than the monoxide and reducible to the monoxide without appreciable reduction to the metal when subjected to electronic or ionic discharges. These and other objects, features and advantages of my invention will become apparent to those skilled in the art upon consideration of the following description.

More particularly and in accordance with my invention I provide a simple mechanical admixture of a luminescent oxygen containing material with an oxide higher than the monoxide of a metal selected from the group of metals consisting of calcium, strontium, barium, tin, vanadium, chromium and manganese, all of which higher oxides are reducible by the exciting corpuscular energy. One or more of the higher oxides such as the peroxide of these metals, or the pentoxides of vanadium or chromium is intimately mixed with the oxygen containing luminescent material preferably prior to its application as a screen or coating in a cathode ray tube or luminescent lamp. It is desirable, although not necessary, to utilize oxides which are inherently white and light transmitting such as the higher oxides of the alkaline earth metals, calcium, strontium, and barium, rather than the higher oxides which are dark and light absorbing such as manganese dioxide although the use of dark oxides reduces halation of the luminous trace in cathode ray tubes. Furthermore, inasmuch as all oxides of these metals are rather low in luminescent properties I provide a relatively low ratio of the higher oxide to the oxygen containing phosphor so that the mixture, notwithstanding the added oxide, has high luminescent properties. More particularly, I provide between 0.1% and 20% of the oxide by weight with respect to the oxygen containing phosphor. The higher amounts of oxide such as from 10% to 20% are useful when using the phosphor in cathode ray tubes of the high intensity picture projection type where the screen is subjected to greater burning effects because of the higher velocity electron bombardment. In accordance with my invention I have found barium peroxide to be particularly advantageous in reducing the burning or deterioration of oxygen containing luminescent materials. The luminescent material, whether it be of silicate, tungstate or other inorganic salt of an oxygen containing acid, is prepared as well known in the art, and to this material I add the desired amount of the higher oxide, such as 2% of barium peroxide by weight, as referred to above. The luminescent material and the higher oxide are then well mixed, preferably in a ball mill, without further grinding or subdivision of the luminescent material.

My invention is likewise applicable to screens of the mixed phosphor type wherein only one material component of the mixture is of the oxide type. For example I have found that cathode ray tubes having a 52% zinc beryllium silicate and 48% zinc sulphide screen mixture showed no burning and practically no loss in screen efficiency even after 500 hours life when the screen material was mixed with 2% barium peroxide by weight based on the weight of the mixed phosphors in the screen material. In this example the weight of the higher oxide used is based on the total weight of the phosphor mixture while the limits referred to above are percentage weights based on the weight of the oxygen containing phosphor. Obviously in the example the equivalent percentage based on the weight of the oxygen containing phosphor component would be slightly over 1%.

My improved luminescent material with its mechanical admixture of a higher oxide of a metal than the monoxide is of particular use in cathode ray tubes and luminescent lamps wherein the discharge exerts a reducing effect upon the luminescent material or the admixed higher oxide. This is particularly true in tubes and lamps of the type incorporating an oxygen fixing getter. Thus while I do not wish to be limited to any particular theory which may account for the improved characteristics of my admixed materials, it appears that the burning and impairment are a result of a partial reduction of the oxygen containing screen material occasioned by the electronic or ionic bombardment. By mixing a small percentage of a higher oxide such as from 0.1% to 20% of barium peroxide with the oxygen containing phosphor I provide a source of oxygen within the screen or coating to replace that lost by the active luminescent material as a result of such bombardment. In a tube or lamp having a screen not made in accordance with my invention it appears that the oxygen is given off from the screen into the bulb space and is fixed or absorbed by the getter on the bulb wall. A deficiency of oxygen is thus produced in the luminescent screen or coating and a chemical reduction of the active screen material occurs. In a tube or lamp having a screen made in accordance with my invention, however, and in which there is a small percentage of barium peroxide or other higher metal oxide than the monoxide, it appears that while oxygen from the luminescent material may be given off by the material into the bulb space, the deficiency of oxygen in the material results in a reduction of the barium peroxide to barium oxide rather than in a permanent reduction of the luminescent screen material. Thus in tubes and lamps where free oxygen within the discharge space is undesirable and a getter is used to absorb this oxygen, the use of a higher oxide of a metal reducible to a lower form of oxide is a definite advantage. Furthermore, the reduction of the peroxide is to a lower oxide form so that free metal is not formed in the screen or coating layer, such free metal, if formed, apparently being conducive to further burning.

While I have described my invention with particular reference to certain silicates and tungstates as examples of luminescent salts of oxygen containing acids, it will be appreciated that my invention is applicable to other oxygen containing luminescent materials and that while I have referred to various phosphors and shown that considerable decrease in burning may be effected by the use of particular higher oxides than the monoxide of certain metals added as a simple mechanical admixture to such a luminescent material, it will be appreciated that other oxides having similar characteristics of being reducible to lower oxide forms without reduction to the metal of the oxide may be used without departing from the spirit of my invention and the scope thereof as set forth in the appended claims.

I claim:

1. A luminescent material for electric discharge devices comprising an inorganic luminescent salt of an oxygen containing acid having in intimate simple mechanical admixture therewith, a compound consisting of a metal and oxygen, said compound being a higher oxide than the monoxide of a metal selected from the group of metals whose higher oxides are reducible to a lower oxide under corpuscular energy bombardment.

2. A luminescent material for electric discharge devices comprising an inorganic luminescent salt of an oxygen containing acid and a compound consisting of a metal and oxygen as an oxide, said metal oxide being reducible to a lower oxide form, said oxide being higher than the monoxide of the metal and being mechanically admixed with said salt to supply oxygen upon reduction of said salt by incident corpuscular radiation.

3. A luminescent material comprising an inorganic luminescent salt of an oxygen containing acid including as a simple mechanical admixture therewith a compound consisting of oxygen and an alkaline earth metal combined as a higher oxide than the monoxide of the alkaline earth metal, said higher oxide being reducible to a lower oxide form under corpuscular energy bombardment.

4. A luminescent material as claimed in claim 2 wherein the quantity of said higher oxide than the monoxide is from 0.1% to 20% by weight of the quantity of the luminescent salt.

5. A luminescent material comprising a luminescent salt of an oxygen containing acid having in intimate simple mechanical admixture therewith an uncombined addition of free barium peroxide.

6. A luminescent material comprising an inorganic luminescent salt of an oxygen containing acid having in simple mechanical admixture therewith an uncombined addition of 1% barium peroxide based on the weight of said salt.

7. A luminescent material comprising a mechanical admixture of zinc beryllium silicate, zinc sulphide and a compound consisting of oxygen and a metal as an oxide, said metal oxide being higher than the monoxide of a metal reducible to a lower oxide form when bombarded with corpuscular energy said metal oxide being from 0.1% to 20% by weight with respect to the weight of said silicate and said sulphide.

8. In combination an electric discharge device comprising an internal luminescent coating including a luminescent salt of an oxygen containing acid having in intimate simple mechanical admixture therewith, an uncombined addition of a higher oxide than the monoxide of an alkaline earth metal, said higher oxide consisting of said alkaline earth metal and oxygen, means to subject said luminescent coating to corpuscular energy to develop luminescence, and means to absorb oxygen liberated by said salt upon reduction of said salt by said discharge.

9. In combination a cathode ray tube having means to develop a cathode ray beam, a luminescent screen exposed to said beam, said screen including a luminescent salt of an oxygen containing acid reducible by the action of said beam and an oxide higher than the monoxide of an alkaline earth metal consisting only of said metal and oxygen mechanically admixed with said salt to supply oxygen to said salt upon reduction of said salt by said beam.

HERBERT NELSON.